Figure 1:
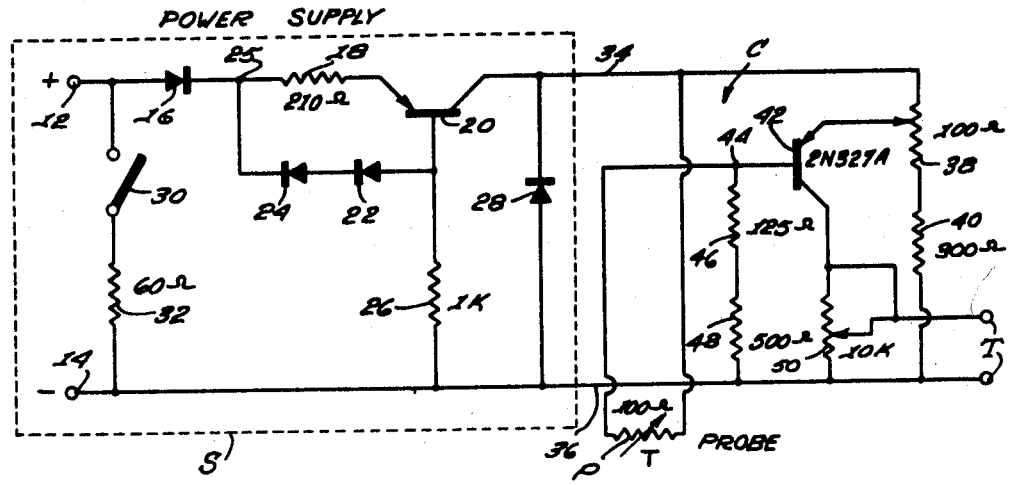

Oct. 8, 1963  A. B. KAUFMAN  3,106,645
TEMPERATURE COMPENSATED TRANSISTOR SENSING CIRCUIT
Filed Feb. 2, 1959

INVENTOR.
ALVIN B. KAUFMAN
BY FULWIDER, MATTINGLY
& HUNTLEY

ATTORNEYS

United States Patent Office 3,106,645
Patented Oct. 8, 1963

3,106,645
TEMPERATURE COMPENSATED TRANSISTOR
SENSING CIRCUIT
Alvin B. Kaufman, 7459 Henefer Ave.,
Los Angeles 45, Calif.
Filed Feb. 2, 1959, Ser. No. 790,755
2 Claims. (Cl. 307—88.5)

The present invention relates to an electrical transducer system and particularly to an electrical system for use in conjunction with a variable-resistance element to provide an electrical signal indicative of a phenomena which varies the resistance of the element.

A variety of transducers exist which convert energy from one form to another. Often the energy conversion is performed to obtain an electrical signal indicative of the degree or intensity of a phenomena. For example, a resistance element which varies in accordance with ambient temperature may be connected in an electrical system, to provide an electrical analog signal indicative of the ambient temperature.

Substantial uniformity-of-charge or linearity between the resistance of the sensing element and the analog signal is normally desirable. Linearity in this regard facilitates more accurate measurements. It is also desirable that a transducer system be capable of providing a relatively-high level of analog signals so that the signals may be transmitted or used without considerable further amplification. Of course, in the development of the analog signal, it is desirable to consume only a small amount of power.

Various types of analog signals may be formed; however, it is often desirable to provide signal representation in which zero signal amplitude coincides to an arbitrary reference level of the sensed phenomena. In the formation of a signal of this type, the system must be capable of providing a zero-level signal. It is also desirable that the system be capable of providing signals of relatively-high amplitude so that a wide scale may be employed if desired.

In general, the present invention provides an electrical transducer system to function in conjunction with a variable-resistance element. The system employs a semiconductor device in conjunction with a pair of voltage dividers each incorporating separate impedances one of which comprises the variable-resistance element. Two electrodes of the semi-conductor devices are connected to junction points in the divider networks and an output circuit is connected to a third electrode of the semi-conductor device. The voltage dividers are asymmetrical whereby relatively-high amplitudes of signals may be provided, and the variation in the signals provided is somewhat linear with respect to the variation in resistance of the element.

An object of the present invention is to provide an improved electrical transducer system.

Another object of the present invention is to provide a transducer electrical system which may be economically manufactured.

Still another object of the present invention is to provide an electrical transducer system having a variable range of operation and capable of providing relatively high-amplitude analog signals.

A further object of the present invention is to provide a relatively-linear transducer system for converting variations in resistance into an electrical analog signal.

Still a further object of the present invention is to provide an electrical transducer system incorporating asymmetrical divider circuits and a semi-conductor device, which system is relatively stable in operation and provides analog signals generally proportional to variations of a resistive value.

Figure 2:
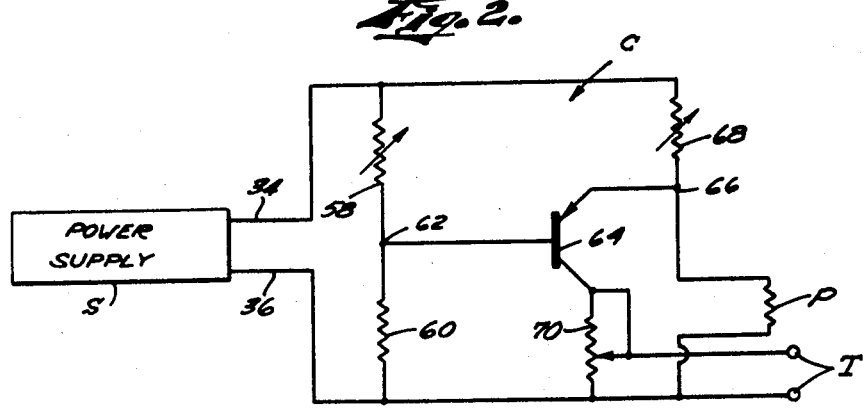

These and other objects and advantages of the present invention will become apparent from the following detailed description when taken in conjunction with the appended drawings, wherein:

FIGURE 1 is a diagrammatic representation of one system constructed in accordance with the principles of the present invention; and FIGURE 2 is a diagrammatic representation of another system constructed in accordance with the principles of the present invention.

Referring now preliminarily to FIGURE 1, there is shown a power supply S which provides power to a circuit, generally indicated by the letter C, incorporating a probe P comprising a variable-resistance element. The probe P may, for example, comprise an element which changes in resistance with variations in temperature. In general, the power supply S energizes the circuit C incorporating the probe P to provide an analog signal across terminals T indicative of the phenomena, e.g., temperature, effecting the resistance of the probe P.

Considering the system of FIGURE 1 in greater detail, the power supply S is energized by a direct-current voltage applied across terminals 12 and 14. The terminal 12 is connected through a diode 16 and a resistor 18 to the emitter electrode of a transistor 20. The base electrode of the transistor 20 is connected through Zener diodes 22 and 24 to a junction point 25 between the diode 16 and the resistor 18. The base electrode of the transistor 20 is also connected through a resistor 26 to the terminal 14. The transistor 20 and the associated circuitry including the Zener diodes 22 and 24, serve to provide a regulated voltage between the collector electrode of the transistor and the terminal 14 by controlling the transistor according to the voltage developed across the resistor 26. This method of voltage stabilization is well-known in the prior art. The output voltage of the power supply S is further stabilized by a Zener diode 28 interconnecting the collector electrode and the terminal 14, which diode passes a varying amount of current in accordance with applied voltage.

The diode 16 in the power supply S is a conventional unilateral conducting device and serves to prevent damage to the elements in the power supply S should the terminals 12 and 14 be incorrectly connected to a source of direct-current voltage.

A series circuit, including a temperature-sensitive switch 30 and a heating resistor 32, is also connected between the terminals 12 and 14. The temperature-sensitive switch 30 and the resistor 32 are mounted in heat-transfer relationship with temperature-sensitive elements in the power supply S, and the circuit C (except the probe P) as by encapsulating the elements in a common heat-insulating structure. As a result, the temperature of the heat-sensitive elements in the power supply S and the circuit C is maintained within limits thereby stabilizing the operation of the system.

The output of the power supply S, appearing between the collector electrode of the transistor 20 and the terminal 14 is applied to conductors 34 and 36 respectively in the circuit C. The conductor 34 is connected to the conductor 36 through a voltage divider including a serially-connected potentiometer 38 and resistor 40. The variable terminal of the potentiometer 38 is connected to the emitter electrode of a transistor 42. The base electrode of the transistor 42 is connected to a junction point 44 between the probe P and resistors 46 and 48 which are connected in a series circuit comprising a voltage divider that is connected between the conductors 34 and 36.

The collector electrode of the transistor 42 is connected to both the fixed and the variable terminals of a potentiometer 50 so as to short out a variable portion of the potentiometer 50. Hence, the potentiometer 50 behaves merely as a series rheostat. The remaining fixed terminal of the potentiometer 50 is connected to the conductor 36 along with one of the output terminals T. The other of the output terminals T is connected directly to the collector electrode of the transistor 42.

In the operation of the circuit C, the probe P, may, for example, comprise a temperature-sensitive variable-resistance element. The resistance of such element varies directly as the temperature, for example. In this event, the voltage drop across the probe P changes with temperature, which in turn results in a change in the voltage at the junction point 44. That is, assuming the terminal 14 and conductor 36 to be at reference potential, the occurrence of an increase in the resistance of the probe P will result in an increase in the voltage level of the junction point 44, which voltage is applied to control the current flowing from the emitter electrode to the collector electrode through the transistor 42. The increased current through the transistor 42 results in an increased voltage drop across the potentiometer 50 which appears across the terminals T. Therefore, it may be seen that an increase in the temperature about the probe P is manifest by a higher-level signal across the terminals T. Of course, a decrease in the temperature about the probe P causes an opposite effect to reduce the signal across the terminals T.

In the system of FIGURE 1, the resistance of the probe P is normally substantially smaller than the resistance of the resistors 46 and 48. Therefore, the current through the voltage divider formed by these elements is substantially unaffected by variations in the value of resistance presented by the probe P. This consideration provides substantial change in the voltage at the junction point 44 upon a variation in the resistance of the probe P. Furthermore, the resistance between the base and the emitter electrodes of the transistor 42 is normally relatively small with the result that the bias voltage of the emitter electrode is quite stable and somewhat independent of the collector and base currents. As a result, the system is more stable, and the output signal is more linear with respect to the observed temperature.

In using the system of FIGURE 1, the potentiometer 38 is first varied to produce a null voltage across the terminals T for a predetermined resistance of the probe P. That is, the potentiometer 38 is set to indicate a zero signal across the terminals T coinciding to an arbitrary degree of the phenomena sensed by the probe P. Next, the potentiometer 50 is adjusted to provide a predetermined signal output across the terminals T for a resistance of the probe P which coincides to a full-scale value. This adjustment may be made by inserting a resistance in place of the probe P which coincides to the minimum or full-scale resistance to be presented by the probe P. In the system shown as an example, the signals appearing across the terminals T may be adjusted to a full-scale value of five volts.

After the above-described operations have been performed, the system is ready for use as a stable circuit for providing generally-linear output signals indicative of the resistance presented by the probe P. Of course, the output signals may be variously employed in accordance with the knowledge of the prior art.

The system of FIGURE 1 may be most satisfactorily employed in conjunction with variable resistance elements having relatively low resistance, e.g., 100 ohms. In certain instances it is desirable to use variable-resistance elements having considerably more resistance. A circuit constructed in accordance with the principles of the present invention which utilizes elements of greater resistance is shown in FIGURE 2.

The system of FIGURE 2 employs a power supply S similar to that shown in FIGURE 1 and a probe P incorporating a variable-resistance element which is incorporated in the circuit C. The probe P may present a resistance in the range of 4K.

The conductors 34 and 36 from the power supply S are connected to a series circuit including a variable resistor 58 and a fixed resistor 60. The junction point 62 between the resistors 58 and 60 is connected to the base electrode of a transistor 64. The emitter electrode of the transistor 64 is connected to a junction point 66 between the probe P and a resistor 68 to form a voltage divider that is connected across the conductors 34 and 36. The collector electrode of the transistor 64 is connected to both an end terminal and a variable terminal of a potentiometer 70. The other end terminal of the potentiometer 70 is connected to the conductor 36 and one of a pair of terminals T. The other of the terminals T is connected to the collector of the transistor 64.

The operation of the system of FIGURE 2 is somewhat similar to that of FIGURE 1; however, the higher resistance of the probe P in FIGURE 2 is better presented in the emitter circuit of the transistor 64.

The system is prepared for operation by first adjusting the arbitrary reference level or zero of the output signal. The resistance of the probe is made to coincide to the reference level and the resistor 58 is adjusted to produce zero signal across the terminals T. Next, the full-scale adjustment is made by providing the probe resistance to be full scale and adjusting the potentiometer 70 to provide a full-scale signal across the terminals T.

In the operation of the system of FIGURE 2, a variation in the resistance of the probe P produces a change in the voltage at the junction point 66 which varies the current through the potentiometer 70 to effect a variation in the signal appearing across the terminals. Normally, if the system is operating to provide an indication of temperature, an increase in temperature results in an increased resistance for the probe P which reduces the current through the probe P and the resistor 68 to thereby lower the voltage at the junction point 66 and the emitter electrode. The increased voltage drop at the emitter electrode lowers the transistor bias to produce a higher signal at the terminals T. The occurrence of a temperature decrease results in an opposite series of changes to provide a decrease in the signal across the terminals T.

It is to be noted that the system of FIGURE 2 incorporates similar advantages to those specified with regard to FIGURE 1, and particularly affords substantial linearity along with the capability of providing substantial analog signals in conjunction with a relatively low-power transducer.

From the foregoing it will be apparent to those skilled in the art that the present invention provides a greatly improved and satisfactory electrical transducer system fully capable of achieving the objects and advantages herein set forth. It will be apparent, however, that variations may be made in the electrical transducer system without departing from the novel features thereof. Consequently, the present invention is not to be limited to the particular arrangement herein shown and described except as defined by the appended claims.

I claim:

1. A temperature compensated electrical transducer system, comprising: a transistor including a base, emitter, and collector; a source of voltage having first and second output terminals, said source of voltage including a temperature sensitive switch and a heating resistor mounted in a heat-transfer relationship with said transistor, said switch being connected to energize said heating resistor and responsively actuated to maintain said transistor within a certain temperature range whereby operation of said system is stabilized; a voltage divider including a transducer having a relatively low impedance varying in accordance with a sensed phenomena and connected in series with a resistor, the free end of said transducer being connected to said first output terminal, the common junction between said transducer and resistor being connected to said base, and the free end of said resistor being connected to said second output terminal; a potentiometer connected between said first and second output terminals and having an adjustable output tap connected to said emitter for biasing the same; and an adjustable resistor connected between said collector and said second output terminal for providing an output signal across said adjustable resistor, said potentiometer tap being adjustable for varying the bias on said emitter and establishing a cut-off point for said transistor at a first predetermined impedance of said transducer and said adjustable resistor being adjustable for establishing a maximum magnitude of said output signal at a second predetermined impedance of said transducer.

2. A temperature compensated electrical-transducer system, comprising: a transistor including a base, emitter and collector; a source of voltage having first and second output terminals, said source of voltage including a temperature sensitive switch and a heating resistor mounted in a heat-transfer relationship with said transistor, said switch being connected to energize said heating resistor and responsively actuated to maintain said transistor within a certain temperature range whereby operation of said system is stabilized; a first voltage divider including a first resistor which can be adjustable in resistance connected in series with a second resistor, the free end of said first resistor being connected to said first output terminal, the common junction between said first and second resistors being connected to said base, and the free end of said second resistor being connected to said second output terminal; a second voltage divider including a third resistor which can be adjustable in resistance connected in series with a transducer having a relatively high impedance varying in accordance with a sensed phenomena, the free end of said third resistor being connected to said first output terminal, the common junction between said third resistor and said transducer being connected to said emitter, and the free end of said transducer being connected to said second output terminal; and a fourth resistor which can be adjustable in resistance connected between said collector and said second output terminal for providing an output signal across said fourth resistor, said first resistor being adjustable for establishing a cut-off point for said transistor at a first predetermined impedance of said transducer and said fourth resistor being adjustable for establishing a maximum magnitude of said output signal at a second predetermined impedance of said transducer.

References Cited in the file of this patent
UNITED STATES PATENTS

| | | |
|---|---|---|
| 1,363,267 | Porter | Dec. 28, 1920 |
| 2,359,334 | Smith | Oct. 3, 1944 |
| 2,608,604 | Hart | Aug. 26, 1952 |
| 2,698,416 | Sherr | Dec. 28, 1954 |
| 2,762,874 | Barco | Sept. 11, 1956 |
| 2,808,471 | Poucel | Oct. 1, 1957 |
| 2,909,926 | Lingard | Oct. 27, 1959 |
| 2,922,930 | Scheave | Jan. 20, 1960 |
| 2,945,133 | Pinckaers | July 12, 1960 |